Feb. 9, 1926.                                             1,572,031
                    J. O'CONNELL ET AL
   PASTEURIZER FOR CREAM, MILK, OR OTHER LIQUIDS OR SEMILIQUIDS
               Filed Jan. 28, 1924    3 Sheets-Sheet 1

Inventors
J. O'Connell
H. H. Kerr
By Marks & Clerk attys

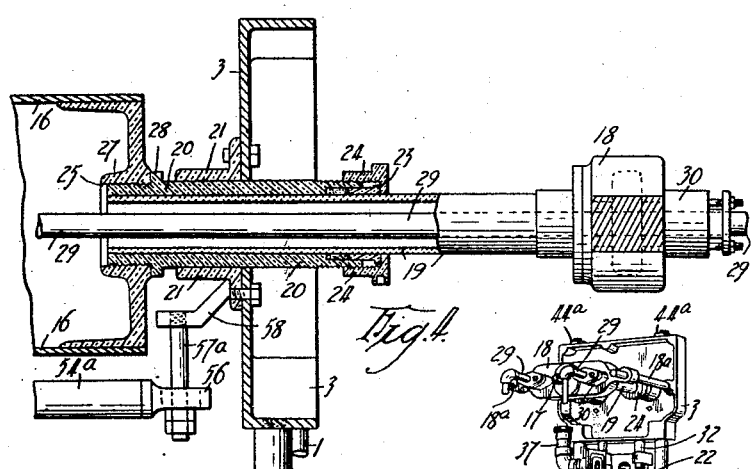
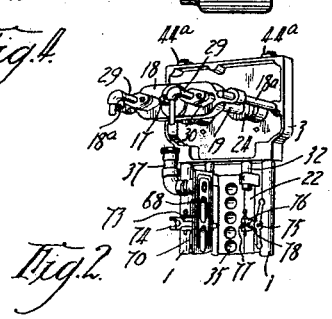
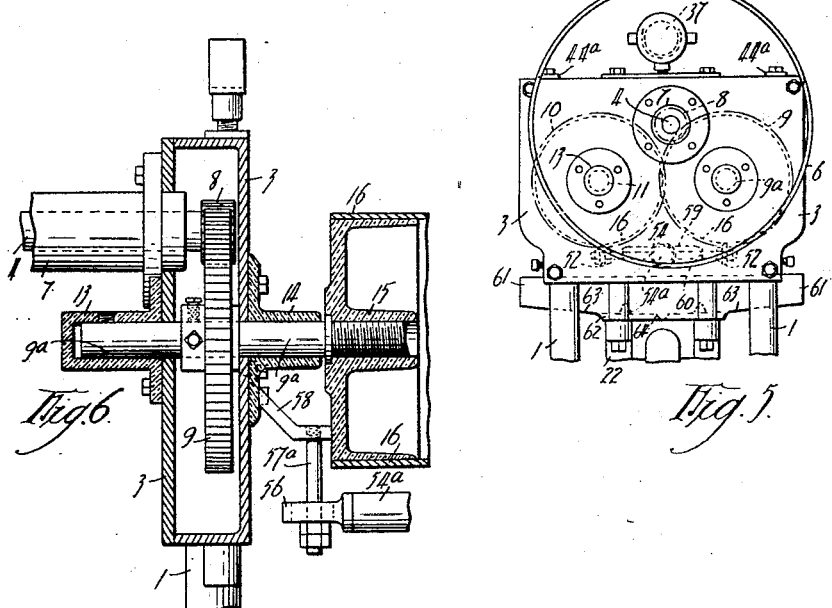
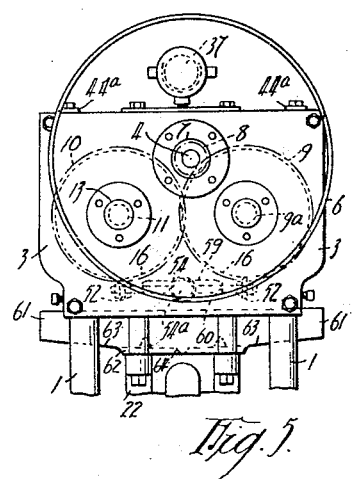
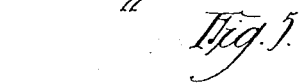

Feb. 9, 1926.
J. O'CONNELL ET AL
1,572,031
PASTEURIZER FOR CREAM, MILK, OR OTHER LIQUIDS OR SEMILIQUIDS
Filed Jan. 28, 1924   3 Sheets-Sheet 3
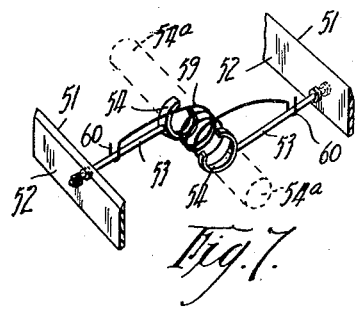
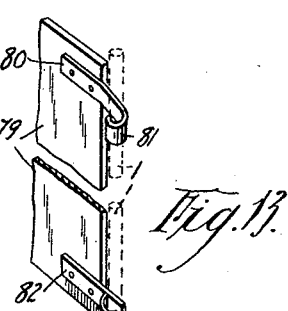
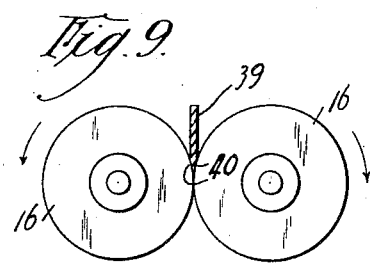
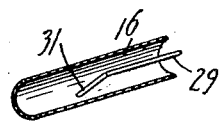
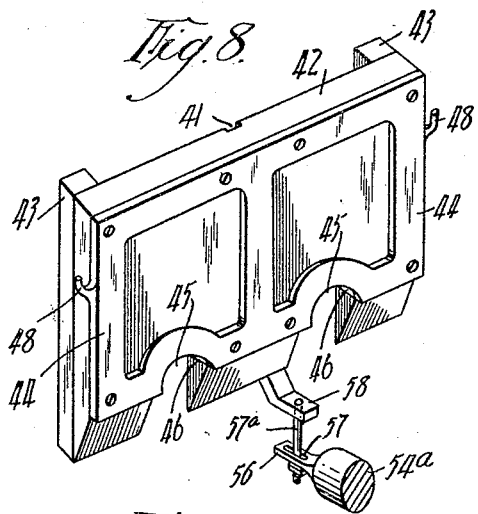
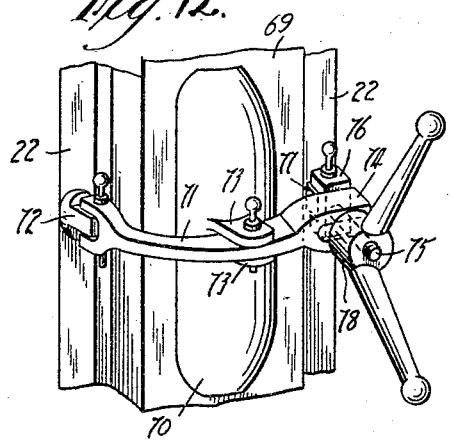
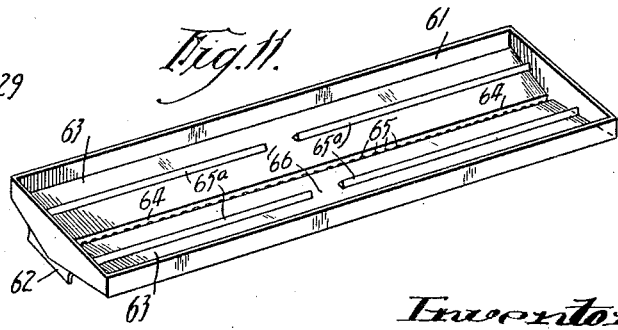

Patented Feb. 9, 1926.

1,572,031

UNITED STATES PATENT OFFICE.

JOSEPH O'CONNELL AND HAROLD HAMILTON KERR, OF KENSINGTON, AUSTRALIA.

PASTEURIZER FOR CREAM, MILK, OR OTHER LIQUIDS OR SEMILIQUIDS.

Application filed January 28, 1924. Serial No. 689,194.

*To all whom it may concern:*

Be it known that we, JOSEPH O'CONNELL and HAROLD HAMILTON KERR, both subjects of the King of Great Britain, residing at Macaulay Road, Kensington, in the State of Victoria, Australia, have invented certain new and useful Improvements in and Relating to Pasteurizers for Cream, Milk, or Other Liquids or Semiliquids; and we do declare the following to be a full, clear, and exact description of the invention, such as will enable others skilled in the art to which it appertains to make and use the same.

This invention relates to a method of and means for pasteurizing cream, milk, or other liquids or semi-liquids. The invention is particularly useful in treating cream and will be so described herein, but it is to be understood that the invention is not limited to the treatment thereof, but may be employed in treating other liquids or semi-liquids where it is desired to destroy dangerous microbe organisms and fermentation bacteria contained therein.

This invention comes within the scope of what is known by those conversant with the art as "flash" system of pasteurization.

In view of the departure from the accepted practice of the present invention and the vast importance of the results obtained thereby it is deemed necessary to make a full disclosure and have a proper understanding of the significance of the method of and means hereinafter described to premise the description of the method of and means by clearly indicating the nature of the problems involved.

The present manner of treating cream by the "flash" system of pasteurization is in most instances to pass the cream from a receiver into a cylindrical or paraboloid shaped water jacketed vessel, the interior of which is fitted with an agitator or stirrer, so shaped that it has a lifting tendency and by its centrifugal action causes the cream to make contact with the heated internal metal wall of the vessel and during its upward movement the cream becomes raised in temperature. During the continuation of this process a portion of the milk solids, partly due to the high temperature and partly due to the stirrer not being in contact with the wall of the vessel, adheres to the said wall and gradually forms a coating thereon, reducing the heat conducting surface, consequently lessening the capacity of the appliance and seriously affecting the uniformity of the temperature during treatment. It is therefore evident that the efficiency of pasteurization apparatus of this kind must necessarily be low, and it follows that the method of and means now in general use for "flash" pasteurization is capable of vast improvement. Having stated the present status referring to the "flash" system of pasteurization it is advisable to set forth some of the advantages of this invention which is to provide for the purposes desired a method of treating cream or other liquids or semi-liquids whereby the treatment is expedited and uniformity of temperature is maintained throughout the liquid under treatment and the capacity of the apparatus is continuously maintained at a maximum during treatment.

The object of this invention is to provide one or more hollow horizontal longitudinal rotating element or elements as the heating medium whose exterior surface will be continuously presented to the cream in a clean and smooth condition during treatment, thereby permitting a uniform and desired temperature to be maintained thereof.

Another object of this invention is to provide one or more hollow horizontal longitudinal rotating elements as the pasteurizing medium or part thereof.

Another object is to provide means to prevent adhesion of the liquid or semi-liquid to the exterior surfaces of the respective heating element, such means also providing for an even uniform distribution of the cream to the under disposed catchment and distributing trough or basin.

A further object of this invention is to provide means to regulate the temperature of the heating element or elements. Provision is also made for the employment of a regenerative heater to raise and lower respectively the temperature of the milk during its flow through and over the tubes thereof, and means are provided to ensure an effective and even flow of the cream to the heating element or elements.

A further object of this invention is to provide means capable of enabling a continuous supply of cream to be made to the distributing trough or basin. This invention also provides means to facilitate the internal cleansing of the tubes of the regenerative heater, and means are also embraced in this invention to ensure metal contact surfaces in connection with the regenerative heater and provide a thoroughly tight joint at the connecting parts to prevent leakage of the cream during its passage through the tubes of the regenerative heater, and provision is also made to enclose the whole of the apparatus to obviate contamination during treatment of the cream by dust or other impurities.

In order that our invention may be the more easily understood, reference will be made to the accompanying sheets of drawings in which—

Fig. 2 is a top view of one end of the pasteurizer showing a door of the regenerative heater open, and the supply pipe therefrom disconnected.

Fig. 4 is an enlarged sectional view of portion of Fig. 3 showing the bearing of the heating medium at the non-driving end and also the arrangement of pipes for supplying steam to the heating medium and pipe for removing therefrom the condensed steam.

Fig. 5 is a front view of the driving end and top portion of the pasteurizer showing in dotted lines the catchment and distributing trough or basin, the gear wheels, heating mediums and scrapers all hereinafter described.

Fig. 6 is a sectional elevation of the driving end showing the gear wheels and bearings used for the heating medium and also the form of supporting bracket carrying the scraping apparatus hereinafter described.

Fig. 7 is a partly sectional view of the scraping apparatus, the supporting rod being shown in dotted lines for sake of clearness.

Fig. 8 illustrates the walls disposed at each end of the heating mediums to direct the liquid running therefrom during feeding and heating operations.

Fig. 9 is an end view of the heating mediums and showing a bar centrally disposed in a position to prevent the liquid escaping between same.

Fig. 10 illustrates drawn to a small scale a section of portion of the heating medium shown, and showing the bent tube for removing the condensed steam.

Fig. 11 is a view of the catchment and distributing trough or basin hereinafter described.

Fig. 12 illustrates drawn to a large scale the locking apparatus of the regenerative heater whilst Fig. 13 is a view of hinge and attaching means for the double doors disposed at each side of the regenerative heater.

Figure 1:
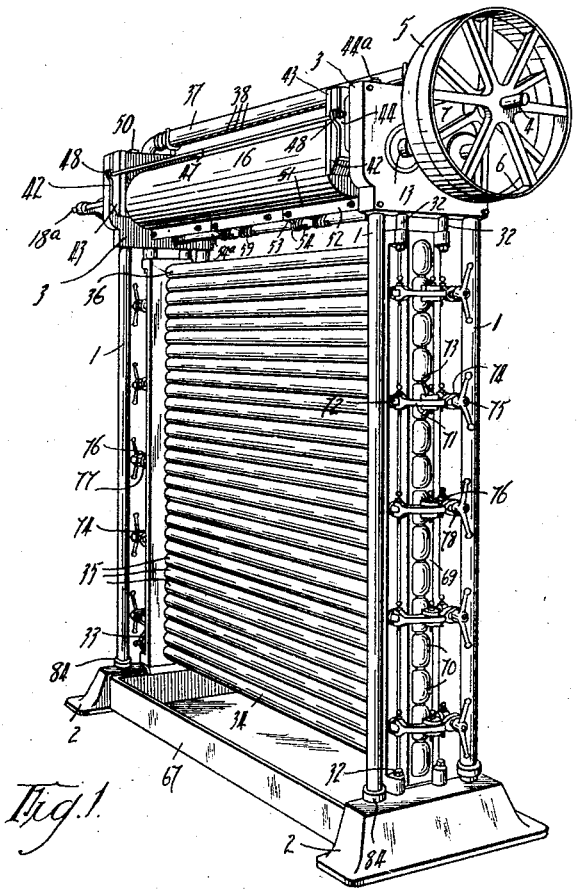
Fig. 1 is a general view of apparatus embodied in our invention, a catchment distributing trough or basin hereinafter described being omitted to permit better illustration of certain parts.
Figure 3:
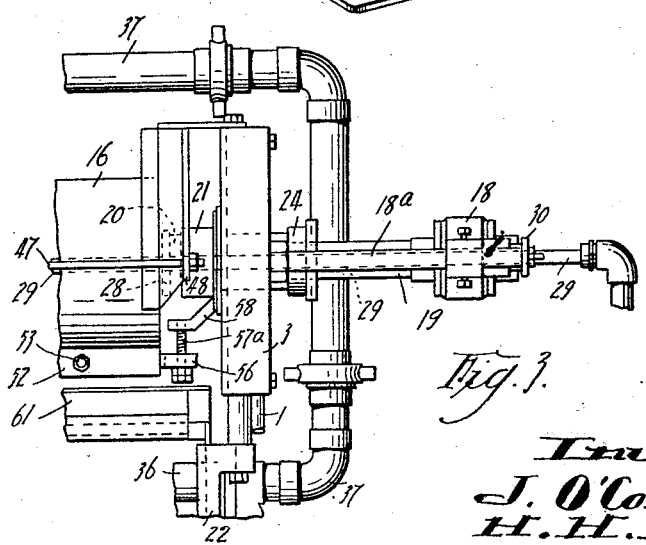
Fig. 3 is a sectional elevation of apparatus embodied in this invention and hereinafter described.

In our invention we employ standards 1 preferably two at each end and tubular in formation, each being fixed to a suitable base 2, the upper portion of two of the standards are connected to a box 3, one of such boxes encloses the driving gear; this end will be termed the driving end, said gear consists of a driving shaft 4, with fast and loose pulleys 5 and 6, and runs in a bearing 7, bolted on the outer exterior wall of the respective box 3; mounted on the shaft 4 is a pinion wheel 8 gearing with a toothed wheel 9 on the shaft 9$^a$, such wheel 9 in turn gears with a corresponding wheel 10 mounted on the shaft 11 carrying the other or second heating medium hereinafter described.

It will be seen in the drawings that the main shaft 4 is disposed a little out of centre of the two wheels 9 and 10, this is to allow the gearing of the pinion wheel 8 with the respective gear wheel before referred to.

Both the shafts 9$^a$ and 11 run in outer and inner bearings 13 and 14 respectively, bolted to the outer and inner exterior walls of the box 3; the inner end of each shaft 11 and 9$^a$ is threaded to engage a corresponding thread provided in the boss 15 formed at a central position with the respective heating medium consisting of a hollow rotary longitudinal cylinder or roller 16 disposed horizontally.

Preferably two of such heating elements are employed, placed parallel side by side. To carry out the desired treatment, it is preferred that the speed of the heating elements be slow.

The heating agent may consist of either steam or hot water, the former being preferred; the steam is supplied through the pipe 17 to a steam box 18 supported by rods 18$^a$ fixed at each side of the respective box 3, the steam passes from 18 through a hollow shaft 19 to the respective cylinder or roller 16; this steam inlet construction is placed at what will be termed the non-driving end of the heating elements.

The arrangement of parts at this particular end is such that free rotation must be provided for the respective cylinders or rollers, at the same time prevent leakage of the heating agent thereat.

As stated before the steam passes through the hollow shaft 19 upon the exterior of which is disposed and runs a spindle 20 (see Fig. 4) supported by and running in the bearing 21 bolted to the inner exterior wall of the other box 3 of similar construction to that before referred to.

At the outer end of the spindle 20 a packing gland 23 is provided being retained by the nut 24, screwed home on the spindle 20 whose inner end is screw threaded and engages the correspondingly threaded central hole 25 of the boss 27 of the respective cylinder or roller 16. To limit the movement thereof, a limitation stop or flange 28 is formed on the spindle 20.

The temperature of each cylinder or roller 16 will be regulated according to the quantity of condensed steam therein i. e. the height or level of the water allowing contact with the desired area of its interior, the level is adjusted by the employment of a draining and preferably rotary, or it may be fixed pipe, 29 passing through the gland 30 thence through the steam box 18 and is continued through the hollow shaft 20 entering the cylinder or roller 16 when it has continued for some distance, the end being bent diagonally to bring its inlet 31 close or adjacent to the interior surface of the cylinder or roller (see Fig. 10). When employing a rotary pipe the turning movement of the outer end of the pipe 29 compels the inlet end 31 to assume the required angle or position to allow the water at the particular height or level to enter the pipe and flow freely therethrough, finally passing into any desired catchment means; the water may be drawn through the pipe by any suitable suction or the like means.

The cream at its normal temperature is preferably fed by a pump, or gravitation may be used, to an adjustable regenerative heater disposed at the required distance beneath and preferably centrally between the cylinders or rollers 16; each solid side 22 of the heater is fixed to the bottom of the respective box 3 and base 2 by bolts 32.

The cream enters at 33 passing along the lower tube 34 of the regenerative heater at a normal temperature, and is forced through the several parallel tubes 35 passing out of the top tube 36 (see Fig. 2) it is then conveyed along by the director tube 37 being discharged therefrom through the holes 38 providing a uniform distribution of the cream on to the cylinders or rollers 16 beneath. The centrally disposed bar 39 with its inclined lower edges 40 which corresponds to the contour of the surface of the cylinders or rollers 16, prevents the cream escaping between the latter as it falls thereon; the said bar 39 is supported and held in position by inserting the ends in a vertical slot 41 (see Fig. 8) provided at the rear of the wall of a director plate 42; this plate consists of wood of a length greater than the width of the two cylinders or rollers 16 when in position, the ends of same at the sides are covered or partly enclosed by the longitudinal vertical bars 43 fixed at each end of the plate 42, the latter having secured to its face a frame 44 forming supporting means by each of its curved openings 45 resting on the shafts 9$^a$ and 11 respectively corresponding openings 46 are made in the plate 42 held vertically in its set position by the transverse rods 47 bolted to the wings 48 integral with each side of the frame 44.

As an additional means for maintaining the plate in position, adjustable bars 44$^a$ are employed, being bolted to the top of the respective box 3 with a projecting end 50 bearing against the surface of the plate 42.

It will be seen that the cream is prevented from flowing end-ways by such plate 42, it directing at each end of 16 the cream to pass over and towards the front of each respective cylinder and roller 16.

Whilst the cream is in contact with the polished surface of the rotary cylinder or roller 16, it is further raised in temperature according to the degree of heat imparted to the cylinder body thereof, over which it passes, and on reaching the bottom of the rotary cylinder or roller 16, is met by the knife like edge 51 of one or more adjustable scrapers 52, each edge of which is in contact with the polished surface of the rotary cylinder or roller 16, each scraper consists of preferably a wooden bar running for the full length of the cylinders and divided into a number of sections so that a continuous knife like edge 51 will be presented to the surface of the cylinder or roller 16, even if the wood becomes effected by warping, caused by weather conditions or under which the scraper operates.

Each section of the bar is supported by an arm 53 attached thereto, its other end having a curved fork holder 54 which partly encircles the adjustable rod 54$^a$ to allow free movement thereon, the rod 54 runs the full length of the rotary cylinders or rollers 16, it being disposed beneath same, each of its ends 56 are flattened, and provided with an elongated slot 57 for a bolt passing therethrough; such bolt 57$^a$ being suspended from a bracket 58 fixed on the exterior of the respective casing 3.

Each section of the scraper is kept up to its work by a coiled spring 59, whose central portion encircles the rod 54$^a$ between the respective semi-circular holders 54, the ends of the spring 59 extend outwardly for some distance from the rod 55 where their hooked end 60 engages and grips the outer portion of the arm 53.

The pressure of the springs 59 is adjusted according to the pressure to be imparted by the knife like edge 51 of each section of the scraper on the surface of the cylinder or roller 16; as the cream passes from the latter, it is as before stated raised to the required temperature for the purpose desired.

The now heated stream of cream falls into the catchment and distributing trough or basin 61 disposed beneath the cylinders or rollers 16 and placed above the regenerative heater before referred to; the trough or basin 61 is supported by the transverse leg 62 at each end, resting on the sides 22 of the regenerative heater, the floor 63 of the trough or basin inclines towards its centre where a channel 64 is provided with holes 65 for the discharge of the cream on to the upper tube 36 of the tubes of the regenerative heater; on the floor 63 of the trough or basin 61 longitudinal ribs 65ª are formed with a central opening 66, this enables the flow of the cream to be regulated from the sides of the trough or basin, so that a desired proportion will be presented to the channel for discharge, the proportion being such that unnecessary accumulation of cream will not take place and block the exit holes 65.

Upon the cream leaving the trough or basin 61 it falls on to and passes over the tubes 34, 35 and 36 of the regenerative heater through which the cream at a lower temperature is flowing in its journey to the distributing pipe 37; the cream is passing in the opposite direction to the falling cream, this as known, has the effect of reducing the temperature to the falling exterior cream and raising the temperature of the upwardly flowing cream within the tubes, the heat of the former being extracted therethrough and communicated to the latter.

The cream falls from the lower tube 34 of the regenerative heater into a receptacle 67 disposed at the bottom of the regenerative heater, being reduced in temperature approximately of the same degree as the untreated cream as it leaves the pump, not shown aforesaid.

Referring to the regenerative heater, all the tubes 34, 35 and 36 extend a short distance beyond the face of the side or tube plate 22, the surrounding edge forming a seat for a rubber band 68, which when the hinged outer plate 69 with the continuation bends 70 thereon is screwed home, is compressed against the faces of 22 and provides a tight joint to prevent leakage of the cream from the tubes, at the same time permitting contact of the metal faces of the two plates 22 and 69, the latter is held closed by a clamp comprising a curved bar 71 hinged at one end to the lug 72 and also hinged at approximately its centre to the lugs 73 on the plate 69; the other end of 71 having a fork 74 in which engages a bolt 75 formed at the end of a fork 76 held by a hinged bolt engaging the lug 77, on the other side of the plate 22, a screw wing nut 78 is employed on the bolt 75 to apply the necessary closing and holding pressure on the plate 69, the opening and closing of the latter plate is simple and allows internal access to the tubes of the regenerative heater to permit an effective cleansing of same to be performed when required.

It is desirable that the regenerative heater be enclosed to prevent contamination of the cream during its progress down the tubes; this is accomplished by the aid of two removable doors 79 placed at each side thereof opening out from the centre, the hinges of each door comprises an upper flat plate 80, whose outer end 81 partly encircles and faces inwardly the respective standard, the lower hinge consists of a straight plate 82 having a semi-circular ring 83 facing outwardly and resting on the flange 84 secured to the standard 1.

It will be seen from this construction that when required, the doors may be easily removed from their connection with the standard by first moving outwardly the top hinge to release it from its engagement with the standard, whereupon the lower hinge permits the disconnection by removal inwardly.

It will be appreciated from the above disclosure of this invention that the heating element or elements will continuously during treatment provide a thoroughly smooth surface to the cream, permitting as before stated a large quantity of cream to be treated with efficiency; the apparatus described consumes a small amount of operating power, and will occupy a small space when installed.

We would also have it understood that the suction pipe may be fixed, in lieu of rotary, and the regenerative heater before referred to may if desired be dispensed with the cream falling into any suitable receptacle and cooled therein, and as hereinbefore stated in lieu of the pump aforesaid, the cream may be supplied to the distributing tube by convenient gravitation means.

We claim—

1. In a pasteurizer, a rotating heating cylinder, a scraper bar having a knife-like ledge bearing against said cylinder, a rod arranged adjacent to the cylinder, arms carrying said scraper bar and provided at their inner ends with forks embracing said rod, a coiled spring surrounding said rod and having a hooked end engaging one of said arms for moving the scraper bar toward the cylinder, and anchoring means connected to the other end of the spring.

2. A pasteurizer including bases, a plurality of standards supported by each base, movable doors hinged to the standards, the upper hinges of the doors each including a plate with its outer end partly encircling and facing inwardly one of said standards, the lower hinge consisting of a straight plate adapted to bear against the inner face of one of the standards and having a semicircular finger facing outwardly, and a flange secured to one of the standards and supporting said finger.

3. A pasteurizer including bases, a plurality of standards supported by the bases, a plurality of boxes mounted upon the upper ends of the standards, shafts rotatably mounted on the boxes, heating cylinders mounted on the shafts, a rod adjustable toward and away from said cylinders, arms having forks pivotally mounted on said rod, scraping bars mounted on said arms and bearing against the cylinders and means for forcing the scraper bars toward the cylinders.

4. A pasteurizer including bases, standards supported by the bases, boxes carried by the standards, a rotatable heating element, a pressure scraper bearing against said element, brackets connected to said boxes, a rod supported by the brackets and carrying said pressure scraper, director plates arranged between the element and boxes, a frame including connecting rods joining said director plates, a direction and supply tube disposed above the heating element, and means for supplying heat to said element.

5. A pasteurizer including supporting standards, boxes carried by the standards, a driving gear arranged in one of said boxes, a driven gear meshing with the driving gear, a driven shaft on which the driven gear is mounted and having screw threads, a heating cylinder having a boss at one end screwed on said screw threads, a hollow shaft rotatably mounted in the other one of said boxes and having a threaded connection with the other end of said cylinder, a stationary pipe extending into the hollow pipe for supplying a heating fluid into the interior of said cylinder, and a suction pipe passing through the last mentioned pipe for withdrawing condensates from the interior of the cylinder.

6. A pasteurizer including supporting standards, heating cylinders rotatably supported at the upper ends of said standards, means for supplying the material to be pasteurized on to said cylinders, scrapers bearing against said cylinders for scraping material from the surface of the latter, a distributing trough arranged beneath the cylinders to catch the material falling therefrom, a material supply device arranged beneath the trough for feeding the material to the supply means and adapted to be heated by the material falling from said trough, means for heating said cylinders, and means for collecting the material falling from said device.

In testimony whereof we have signed our names to this specification.

JOSEPH O'CONNELL.
HAROLD HAMILTON KERR.